United States Patent
Galvez et al.

(10) Patent No.: US 10,482,738 B2
(45) Date of Patent: Nov. 19, 2019

(54) SYSTEM AND METHOD FOR VIDEO/AUDIO AND EVENT DISPATCH USING POSITIONING SYSTEM

(71) Applicant: Sensormatic Electronics, LLC, Boca Raton, FL (US)

(72) Inventors: Miguel Galvez, Salem, NH (US); Abhay Rajan, Leominster, MA (US); Kapang Lam, Chelmsford, MA (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 1052 days.

(21) Appl. No.: 13/965,833

(22) Filed: Aug. 13, 2013

(65) Prior Publication Data

US 2015/0049190 A1    Feb. 19, 2015

(51) Int. Cl.
| | |
|---|---|
| *H04W 12/00* | (2009.01) |
| *G08B 13/196* | (2006.01) |
| *G08B 25/00* | (2006.01) |
| *H04N 7/18* | (2006.01) |
| *G08B 27/00* | (2006.01) |

(52) U.S. Cl.
CPC ..... *G08B 13/19608* (2013.01); *G08B 13/196* (2013.01); *G08B 13/19602* (2013.01); *G08B 25/00* (2013.01); *G08B 25/002* (2013.01); *G08B 27/001* (2013.01); *H04N 7/188* (2013.01)

(58) Field of Classification Search
CPC ......... G01N 21/8806; G01N 21/95684; G01N 21/88; H04N 5/2354; H04N 7/18
See application file for complete search history.

(56) References Cited

U.S. PATENT DOCUMENTS

| | | | |
|---|---|---|---|
| 7,397,371 B2 * | 7/2008 | Martin | G08B 13/19608 340/506 |
| 8,494,481 B1 | 7/2013 | Bacco et al. | |
| 8,780,201 B1 * | 7/2014 | Scalisi | H04N 7/186 348/143 |
| 2007/0262857 A1 | 11/2007 | Jackson | |
| 2009/0091618 A1 * | 4/2009 | Anderson | B60R 1/00 348/143 |

(Continued)

FOREIGN PATENT DOCUMENTS

WO    2007/032731 A1    3/2007

OTHER PUBLICATIONS

International Search Report and Written Opinion of the International Searching Authority, dated Nov. 24, 2014, from counterpart International Application No. PCT/US2014/047742, filed on Jul. 23, 2014.

(Continued)

*Primary Examiner* — Howard D Brown, Jr.
(74) *Attorney, Agent, or Firm* — HoustonHogle LLP

(57) ABSTRACT

A system and method for operating a network security system implementing security cameras, motion sensors, access control systems, security door locks, and mobile panic button devices within a monitored area. Security cameras transmit video to a network video recorder and the video is analyzed by a video analytics system to determine if a security event is occurring. If a security event occurs, a security control system calls a dispatch service, which transmits a notification to only those security guards who are within a given area of the event.

15 Claims, 8 Drawing Sheets

(56) References Cited

U.S. PATENT DOCUMENTS

| | | | |
|---|---|---|---|
| 2009/0207247 A1* | 8/2009 | Zampieron | G08B 13/19669 348/143 |
| 2009/0231483 A1* | 9/2009 | Seddik | H04N 5/2256 348/373 |
| 2011/0267462 A1* | 11/2011 | Cheng | H04N 7/181 348/143 |
| 2012/0002056 A1* | 1/2012 | Nam | G06T 3/40 348/169 |
| 2012/0136559 A1* | 5/2012 | Rothschild | G08G 1/0965 701/117 |
| 2012/0282974 A1* | 11/2012 | Green | H04W 4/12 455/550.1 |
| 2012/0286951 A1* | 11/2012 | Hess | G08B 25/008 340/539.1 |
| 2013/0070069 A1* | 3/2013 | Hyde | G06K 9/00 348/65 |
| 2013/0072783 A1* | 3/2013 | Hyde | G06K 9/00 600/424 |
| 2013/0135467 A1* | 5/2013 | Martin | H04N 7/141 348/143 |
| 2013/0166711 A1 | 6/2013 | Wang et al. | |
| 2014/0062693 A1* | 3/2014 | Watts | G08B 27/006 340/539.11 |
| 2014/0075514 A1* | 3/2014 | Prasad | G06F 21/78 726/4 |
| 2014/0267745 A1* | 9/2014 | Martin | H04N 7/181 348/159 |
| 2014/0333772 A1* | 11/2014 | Periyasamy | H04N 7/18 348/152 |
| 2015/0042788 A1* | 2/2015 | Fujiwara | H04N 5/2256 348/131 |
| 2016/0232777 A1* | 8/2016 | Jedwab | G08B 25/001 |
| 2017/0091555 A1* | 3/2017 | Yousafi | G06K 9/00711 |

OTHER PUBLICATIONS

International Preliminary Report on Patentability, dated Feb. 16, 2016, from International Application No. PCT/US2014/047742, filed on Jul. 23, 2014. Seven pages.

\* cited by examiner

Security control system ~200

Network Security and Safety Devices Table ~201

| Device | Coordinates | AlarmCondition | URL |
|---|---|---|---|
| Camera 1 | | N | feed://... |
| Camera 2 | | N | feed://... |
| Sensor 1 | | N | feed://... |
| Sensor 2 | | N | feed://... |
| ACS 1 | | N | feed://... |
| ACS 2 | | N | feed://... |
| MobilePanic 1 | | N | feed://... |
| MobilePanic 2 | | N | feed://... |
| Microphone 1 | | N | feed://... |
| ... | | | |

202   203   204   205

Network Mobile User Devices Table ~206

| Device | AssignedUser | Coordinates | Address | OnDuty | Capabilities |
|---|---|---|---|---|---|
| Device 1 | User 1 | | | Y | |
| Device 2 | User 2 | | | N | |
| Device 3 | User 3 | | | Y | |
| ... | | | | | |

SYSTEM AND METHOD FOR VIDEO/AUDIO AND EVENT DISPATCH USING POSITIONING SYSTEM

BACKGROUND OF THE INVENTION

Security systems are often comprised of one or more data networks, security devices, safety devices, network video recorders, video analytics systems, and control systems, to list a few examples. The security and safety devices are generally used for monitoring. Examples of security devices include, but are not limited to, security cameras, motion detectors, access control systems (e.g., keypads, fingerprint scanners, radio-frequency identification (RFID) readers), and security door locks. Examples of safety devices include, but are not limited to, smoke detectors and fire alarms. The network video recorders (NVRs) receive image data transmitted from the security cameras over the data network and video analytics systems—which may be integrated with the NVRs—interpret the image data to track individuals, monitor usage, or otherwise determine if a security event is occurring.

There are a number of ways to generate an alarm condition in response to a security event. A fixed or mobile security device (e.g., a mobile panic button among others) can be activated to raise the alarm condition. The video analytics systems can interpret image data to determine that a security event is occurring and then signal the alarm condition. Motion detectors can sense movement and as a result trigger the alarm condition. Access control systems can generate the alarm condition after a number of failed attempts to use an unauthorized keycard, for example. Automated door locks can generate the alarm condition when the door is forced or tampering is detected. Safety devices can generate an alarm condition when sensing heat or smoke as evidence of a fire.

Alarm conditions can also be generated by security guards. This function is typically performed by the security guard staffing the control system or a terminal of the control system. In a prototypical example, the security guard watches image data from several security cameras presented on the control system terminal in a matrix format. When a security event is observed, the security guard can "manually" indicate the alarm condition.

When the alarm condition is generated, a notification of the alarm condition and possibly the underlying security event is sent to security guards and first responders (such as firemen, emergency medical technicians, or police officers), as appropriate, typically by the security guard that is manning the control system terminal. The notification can be transmitted to other security guards via their mobile user devices (e.g., handheld radio transceivers, cellular phones, mobile computing devices (e.g., smartphones, tablets, portable computers), or pagers). If first responders are required, the security guards can contact the appropriate entity or dial "911," which is the national emergency number for the United States.

SUMMARY OF THE INVENTION

Traditionally, security guards were dispatched to a security event in response to an alarm condition by the security guard that was manning the control system terminal. This dispatching security guard would note the location of the alarm condition and then consider the known or expected locations of patrolling security guards. The dispatching security guard would then contact the security guards that were closest to the alarm condition and communicate the type of security event and its location.

There are a number of problems with this approach, however. First, the entire process is "manual." It requires a dedicated security guard to perform the dispatch function. Secondly, it requires that dispatching security guard to predict the position of the closest patrolling security guards when their current positions may not be well known.

More recently, positioning systems, such as chipsets utilizing the Global Positioning System (GPS)—or more generally a global navigation satellite system (GNSS) or regional or site-wide positioning systems—have become ubiquitous to mobile user devices such as cellular phones, smartphones, tablets, and portable computers, and the cost of these devices has become low enough that they can often be provided to each security guard or first responder or team as basic equipment.

The present invention can concern a security system that tracks or accesses the position of patrolling security guards or first responders by using position information from positioning systems of mobile user devices carried by those security guards or first responders. The security system also determines the location of an alarm condition and then dispatches the security guards or first responders that are best able to respond to the security event of the alarm condition based on the position of those security guards or first responders.

Moreover, as security systems include more and more security cameras, it is recognized that the image data generated by those security cameras are useful not only to a dispatching security guard or the security guard that mans the control system terminal but also the security guards or first responders that might be dispatched to security events. In the case of a fire, it would be helpful for firemen to know where in the room a fire is located before entering the room. In the case of a hostage situation, it would be helpful for the police to have real time images before engaging the suspect. In the case of shoplifting, security guards could view live video of the individual that they are seeking. In current systems, these image data are typically only available to the security guard at the control system terminal, however.

According to another aspect, the image data are pushed from security cameras to the mobile user devices of the security guards or first responders that are dispatched to a security event. In an example, the security system pushes those video images to the security guards or first responders that are in closest proximity to the location of the alarm condition giving rise to the security event.

Moreover, some conventional security systems provide security camera image data to each security guard or first responder. This unnecessarily consumes network bandwidth and could thereby overwhelm the data network.

In contrast, the present invention can be used to only transmit the notification to those security guards or first responders who are in proximity to the security event. By transmitting the image data to a subset of the security guards and first responders, it can reduce the total bandwidth utilized in the data network.

In addition, conventional security systems tend to dispatch the security guards to the location of the security event. However, this method is suboptimal when chasing an individual who is on the run. For instance, if a subject steals a purse and is fleeing, dispatching the security guards or police to the location of the event does not address the fact that the subject is no longer there.

In contrast, the present invention can be used to transmit the notification to those security guards or first responders who are in proximity to a predicted path of the subject.

In addition, conventional security systems have required the security guards or first responders to know uniform resource locators (URLs) of the security cameras that can be accessed on the security network.

In contrast, the present invention can be used to push notifications including the URL(s) of the security cameras that are most useful to the security guard or first responder so that by opening the URL(s), the security guard or first responder can view the security camera's image data without wasting time recalling or searching for the URL(s).

In general, according to one aspect, the invention features a security system comprising: one or more security cameras that capture image data, a network video recorder for storing and distributing the image data from the security cameras, and a security control system that receives position information from mobile user devices and provides access to the image data at the mobile user devices based on the position information relative to locations of alarm conditions.

In embodiments, the network video recorder includes a video analytics system that analyzes the image data from the security cameras for security events and generates the alarm conditions in response to detecting the security events in the image data. The security control system determines the locations of the alarm conditions by accessing position information for the security cameras that generated the image data that gave rise to the alarm conditions.

In other aspects of embodiments, the security control system monitors security and/or safety devices for alarm conditions. The security control system then extracts position information from the security and/or safety devices that generated the alarm conditions to determine the locations of the alarm conditions.

In a preferred embodiment, the security control system includes a dispatch service that distributes a reference, e.g., URL, to the image data to one or more mobile user devices in response to the alarm conditions. This reference can be distributed by transmitting a message to the one or more mobile user devices.

The security system can further include one or more fixed or mobile panic button devices that enable users to selectively generate an alarm condition. For the mobile panic button devices, the location of the alarm condition is based on position information for the mobile panic button devices.

In a preferred embodiment, the mobile user devices determine their respective locations and periodically transmit the position information to the security control system. The security control system can then store the position information in a database.

In other aspects, the security control system can determine a predicted path of a subject that generated the alarm condition and provide access to the image data at the mobile user devices based on the position information relative to the predicted path of the subject.

In general, according to another aspect, the invention features a method for distributing security image data, comprising capturing image data, receiving position information from mobile user devices, and providing access to the image data at the mobile user devices based on the position information relative to locations of alarm conditions.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 2 illustrates an exemplary database architecture for a security control system;

DETAILED DESCRIPTION OF THE PREFERRED EMBODIMENTS

Figure 1:
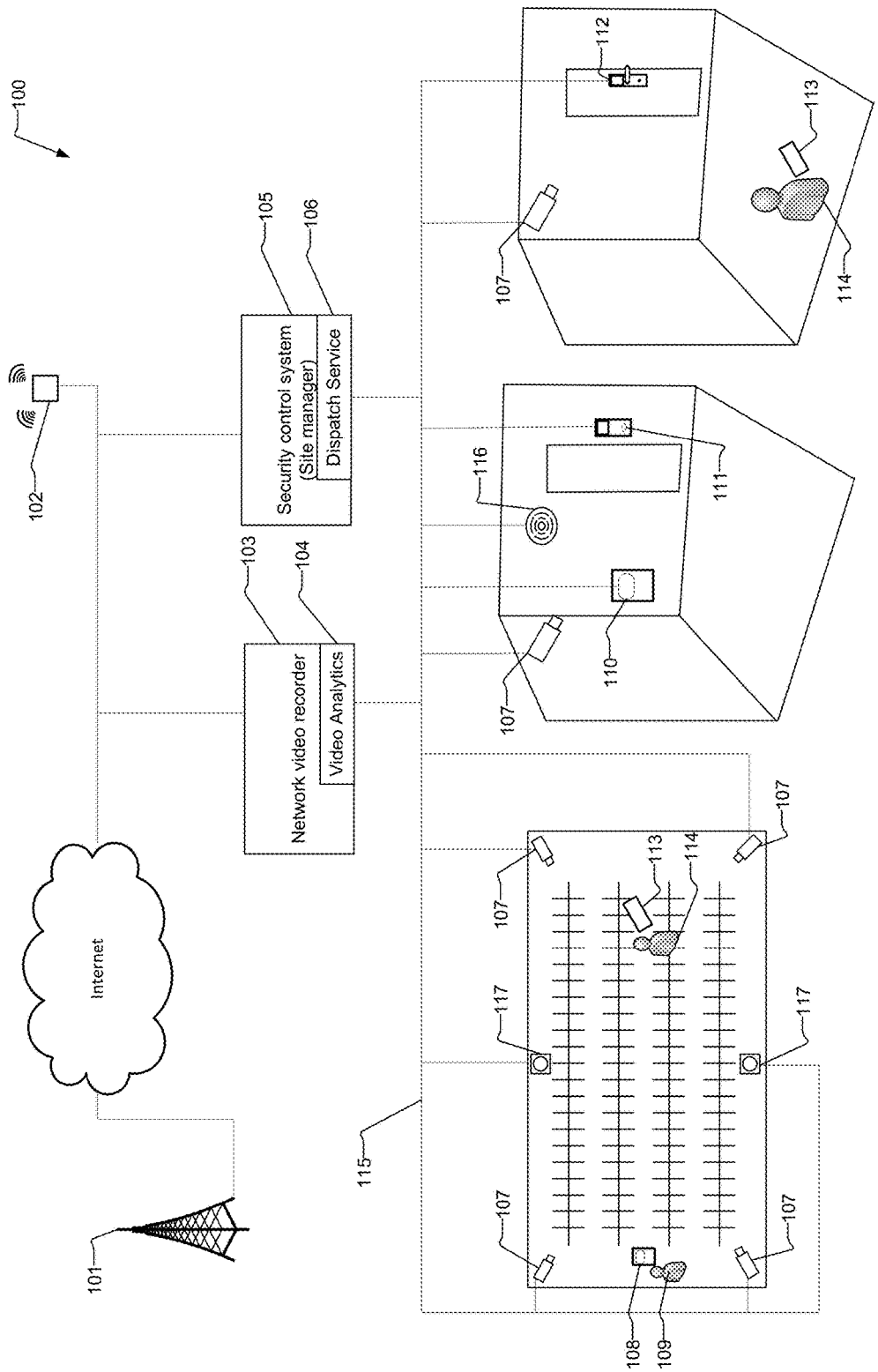
FIG. 1 is a schematic diagram of a network security system to which the present invention is applicable.

FIG. 1 is a schematic diagram of a network security system 100 according to the principles of the present invention.

The security system 100 performs monitoring and tracking in a given area using the security and/or safety devices such as security cameras 107, mobile security devices 108, motion sensors 110, access control systems 111, security door locks 112, smoke detectors 116, and fixed security devices 117. These devices connect directly to the data network 115 or indirectly via one or more wireless access points 102.

Mobile security devices 108 connect to the data network 115 via a wireless access point 102 or via a wide area cellular data network 101. In an example, mobile security devices 108 include mobile panic buttons, which are carried by a user 109. The user 109 can raise alarm conditions by pressing the button on the mobile security device 108 in response to a security event. For instance, a nurse who is walking to her car late at night can raise an alarm condition if she is attacked. An elderly person could push the mobile security device 108 if he falls and cannot reach a phone to call for help.

Mobile security devices 108 and mobile user devices 113, which are typically operated by security personnel or first responders, include positioning systems, which are used to derive the devices' position information. The position information can be computed from GNSSs (e.g., GPS), radio triangulation (e.g., cellular or other wireless network signals), or other similar site-wise or regional systems. When mobile security devices 108 raise alarm conditions, the position information of the devices is used as the position information of the security event.

Fixed security devices 117 operate in the same way as mobile security devices, but are stationary. Typically, fixed security devices 117 are emergency buttons that raise alarm conditions when pressed.

Motion sensors 110 in the illustrated example monitor an area for movement. They are calibrated to tolerate a specific threshold of motion in order to eliminate false positives. In the event that a subject is detected when the sensors are set, the motion sensor 110 raises an alarm condition.

Examples of access control systems 111 are keypad and keycard entry systems. Typically, access control systems 111 control a door lock and open it only for those people who are authorized.

Security door locks 112 are distinguished from access control systems 111 by the fact that the keypad or keycard entry component of the system is integrated on the door handle.

Smoke detectors 116 in the illustrated example monitor an area for smoke, fire, and elevated temperatures. In the event that smoke detectors 116 sense these hazards, they raise alarm conditions.

The security cameras 107 capture and transmit the image data over the data network 115 to the NVR 103, in the illustrated embodiment. In other examples, the image data from the security cameras is wirelessly distributed or sent directly to security guards 114 for viewing.

The NVR 103 in the illustrated example receives and buffers the image data received from the security cameras 107 over the data network 115. It further also preferably stores the image data for later access. The NVR 103 also functions as a secure web server by responding to references or requests for URLs associated with specific security cameras 107 and distributing the image data to mobile user devices 113 making the requests.

The video analytics system 104 is coupled to the NVR 103 in the illustrated example. The video analytics system 104 analyzes the image data for the purpose of extracting events and data. When a security event is detected through the analysis of the image data, the video analytics system 104 then raises an alarm condition to the security control system 105. In one embodiment, the video analytics system 104 analyzes image data that has been archived by the NVR 103 in order to gather further evidence surrounding the security event.

The security control system 105 is responsible for managing all of the security and safety devices as well as mobile user devices 113 connected to the data network 115. It does so by maintaining a database 200, which includes a network security devices table 201 and a network mobile user devices table 206.

A dispatch service 106 is coupled to the security control system 105 and is responsible for transmitting notification of alarm conditions and security events to the mobile user devices 113 of the security guards 114. In the event of an alarm condition raised by a security or safety device, the security control system 105 executes the dispatch service 106. In a preferred embodiment, the dispatch service 106 determines which security guards 114 are within close proximity to the security event and transmits notification to only the mobile user devices 113 of those security guards 114. In another embodiment of the present invention, the dispatch service 106 determines a predicted path of a subject and transmits notification to the mobile user devices 113 of those security guards 114 who are within close proximity to the predicted path.

The mobile user devices 113 connect to the data network 115 via the wireless access point 102 or wide area data network such as a cellular data network 101. The mobile user devices 113 receive notification of security events from the dispatch service 106, retrieve image data associated with the security cameras 107, and display the image data to the security guards 114. Additionally, mobile user devices 113 enable security guards 114 to communicate with each other.

The network security system 100 transmits data across the Internet and over wide area cellular data networks 101 in order to communicate with mobile user devices 113 in the field.

FIG. 2 illustrates the exemplary database 200 architecture for the security control system 105. The security control system database 200 includes the network security devices table 201 and the network mobile user devices table 206 among others.

The network security and safety devices table 201 stores the status, location, and URL of all the security and safety devices in the network security system 100. When new security and safety devices are installed on the network security system 100, the network security and safety devices table 201 is updated to reflect the addition. The network security and safety devices table 201 includes columns for the device name 202, device coordinates 203, device alarm condition 204, and the URL 205 among others.

The security and safety device name column 202 stores a unique name for each security and safety device in the network security system 100.

The security and safety device coordinates column 203 stores the position information of each device in the network security system 100. Types of position information include coordinates (e.g., longitude-latitude pairs) or logical references (e.g., a specific room in a building). For fixed security and safety devices (e.g., security cameras 107, access control systems 111, and smoke detectors 116), the position information is static and determined at the time of installation; but, for mobile security devices 108, the position information is dynamic and updated based on position information sent by the device.

The security and safety device alarm condition column 204 stores a flag representing whether or not specific security or safety devices raised alarm conditions in response to a security event.

The security and safety device URL column 205 stores the reference or URL to the image data that is transmitted to the mobile user devices 113 in response to alarm conditions to thereby allow accessing of the image data via the NVR 103.

The network mobile user devices table 206 monitors the status, location, and address of all mobile user devices 113 in the network security system 100. The network mobile user devices table includes columns for the device's name 207, the assigned user 208, coordinates 209, contact address 210, whether or not the user of the device is on duty 211, and the capabilities of the user 212 among others.

The user device name column 207 stores a unique name for each mobile user device 113 in the network security system 100.

The assigned user column 208 stores the name or other identifier of the security guard 114 in possession of each mobile user device 113 in the network security system 100.

The user device coordinates column 209 stores the position information of each mobile user device 113 in the network security system 100.

The user device address column 210 stores the contact address of each mobile user device 113 in the network security system 100. In the preferred embodiment, the address may be an IP address, a phone number, or any other identifier used to contact a mobile user device 113.

The user device on duty column 211 stores a flag representing whether or not the mobile user device 113 is in use at the time. For example, while a security guard named John is on duty, his mobile user device 113 is able to receive notification of security events in his vicinity; however, when John's shift is over, he may not want his mobile user device 113 to be notified even if he is in the vicinity of security events. The user device on duty column 211 enables the dispatch service 106 to ignore John's mobile user device 113 when it determines which mobile user devices 113 to notify of security events.

The user device capabilities column 212 stores information specifying the abilities of security guards 114 to respond to particular security events. For instance, if a subject is fleeing the scene of a crime in a car, the dispatch service 106 does not notify an unarmed security guard 114 who is on foot, even if he is proximity to the car, because he is incapable of adequately responding to the event. In a different scenario, the dispatch service 106 contacts a security guard 114 who is in a car if he can respond to the security event faster than a security guard 114 who is on foot, even if the security guard 114 on foot is closer to the event.

Figure 3:
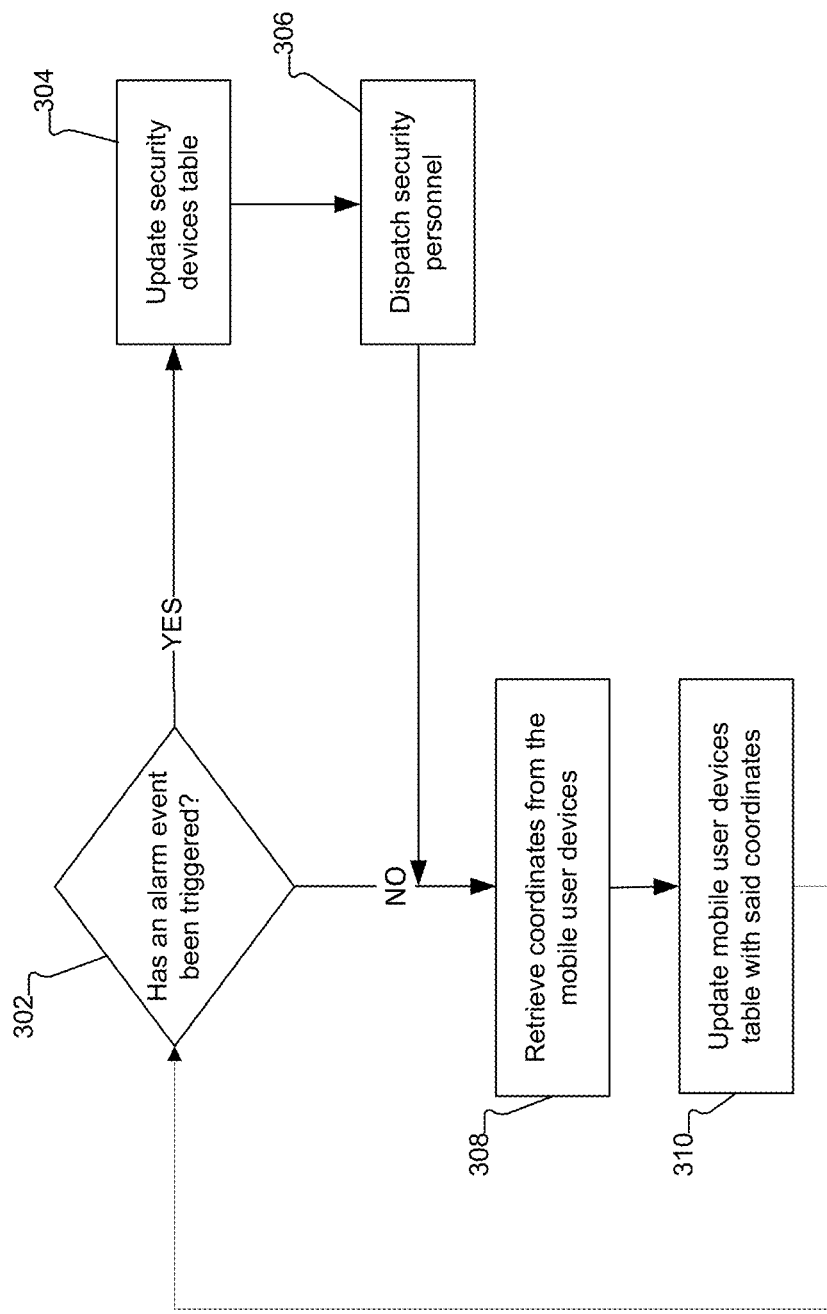
FIG. 3 is a flow diagram illustrating the operation of the security control system to check for alarm conditions and to track mobile user devices.

FIG. 3 is a flow diagram illustrating the operation of the security control system 105 to check for alarm conditions and to track mobile user devices 113.

The security control system 105 determines whether or not alarm conditions have been triggered according to step 302.

If one or more alarm conditions have been triggered, the security control system 105 updates the network security and safety devices table 201 so that the alarm condition column 204 shows that the security or safety device observed a security event according to step 304. Next, the security control system 105 calls the dispatch service 106, which transmits the notification to the one or more security guards 114 according to step 306.

If no alarm condition has been triggered or the dispatch service 106 has notified the security guards 114, the security control system 105 retrieves the position information from the mobile user devices 113 in the field according to step 308. The security control system 105 then updates the coordinates column 209 of the network mobile user devices table 206 with said position information according to step 310. Once step 310 is complete, the security control system 105 transitions back to step 302 and queries the network security system 100 to determine if one or more alarm conditions have been triggered.

Figure 4:
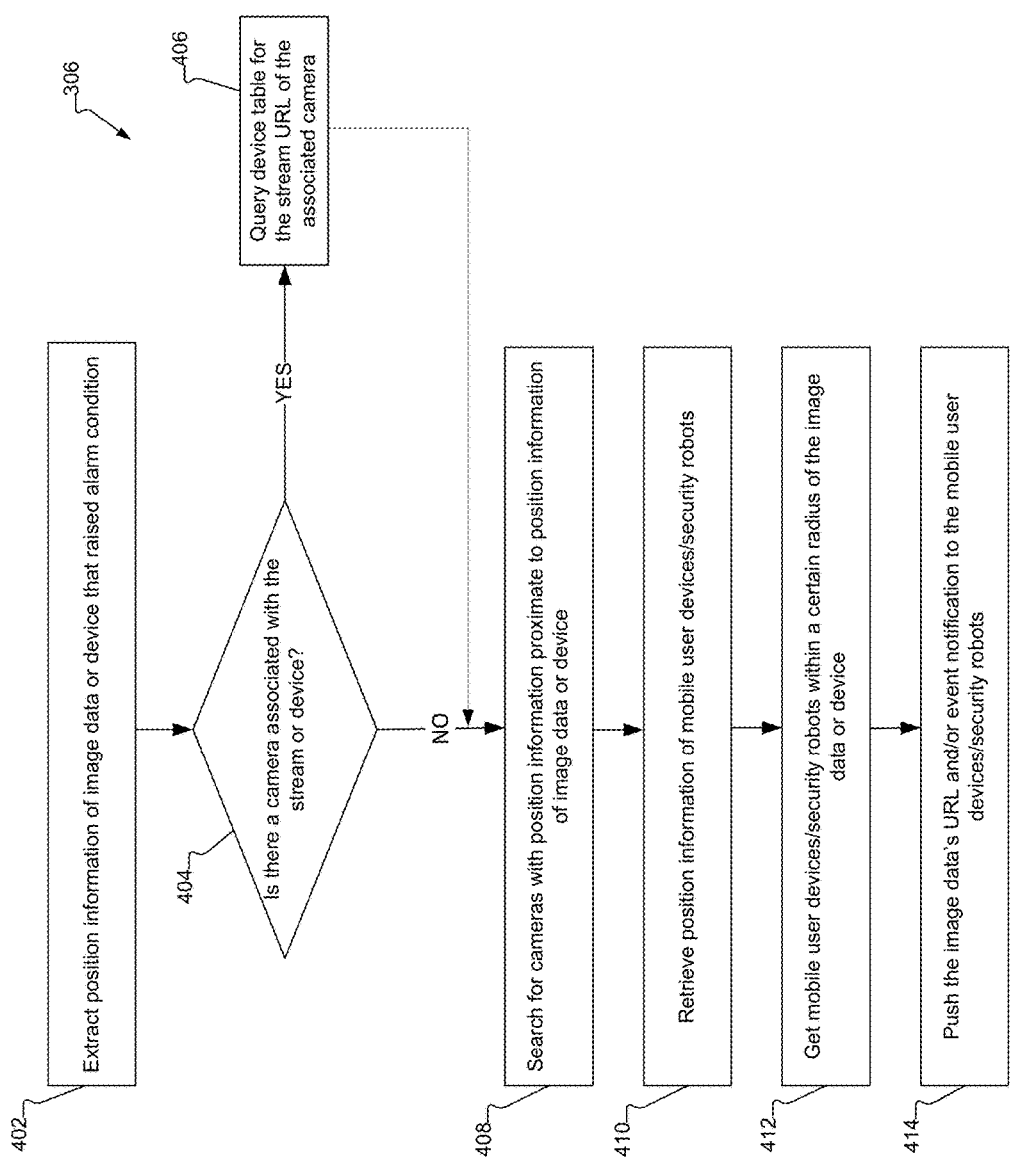
FIG. 4 is a flow diagram illustrating the operation of the dispatch service when the position information of the security and safety devices are used to alert mobile user devices of alarm conditions.

FIG. 4 is a flow diagram illustrating the operation of the dispatch service 106 when the position information of the security and safety devices is used to alert mobile user devices 113 of alarm conditions according to step 306.

According to step 402, the dispatch service 106 extracts the position information of the image data or device that raised the alarm conditions. An alarm condition is raised based on image data when the video analytics system 104 determines that the image data depicts a security event occurring. The position information of the image data is derived from the position information of its associated security camera 107. When the alarm condition is raised by security or safety device, then the location of the alarm condition is determined by reference to the network and safety device table 201.

The dispatch service 106 then determines if one or more security cameras 107 are associated with the image data or device that raised the alarm conditions according to step 404.

If so, the dispatch service 106 queries the network security and safety device table 201 for the URL 205 of the security camera or cameras 107 according to step 406.

If there is no associated security camera 107 or the dispatch service 106 has found the URL 205 of the associated security camera 107, then the dispatch service 106 searches for those security cameras 107 with position information proximate to the position information of the image data or device that raised the alarm conditions according to step 408. According to step 410, the dispatch service 106 retrieves the position information of the all mobile user devices 113 from the network mobile user devices table 206. Then, the dispatch service 106 gets only those mobile user devices 113 that are within a predetermined radius of the image data or device that raised the alarm conditions according to step 412. Lastly, the dispatch service 106 pushes the notification to only those mobile user devices 113 within the radius according to step 414. The notification preferably include a reference or URL of the security cameras that are associated with the device that raised the alarm condition and/or are proximate to the device that raised the alarm condition.

Figure 5:
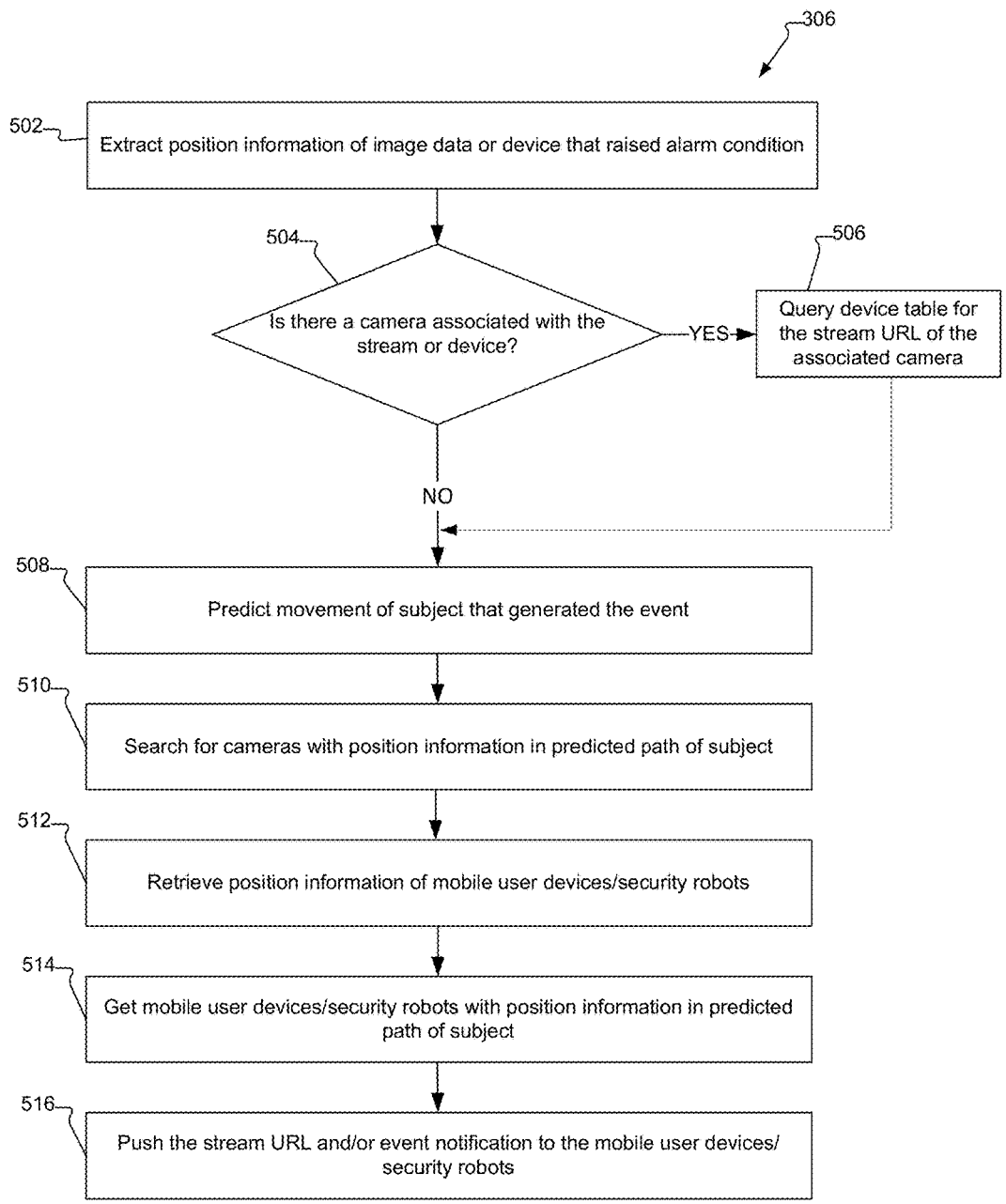
FIG. 5 is a flow diagram illustrating the operation of the dispatch service when a predicted path of a subject is used to alert mobile user devices of alarm conditions.

FIG. 5 is a flow diagram illustrating the operation of the dispatch service 106 when a predicted path of a subject is used to alert mobile user devices 113 of alarm conditions according to step 306.

According to step 502, the dispatch service 106 extracts the position information of the image data or device that raised the alarm conditions.

The dispatch service 106 then determines if one or more security cameras 107 are associated with the image data or device that raised the alarm conditions according to step 504.

If so, the dispatch service 106 queries the network security and safety device table 201 for the URL 205 of the security camera or cameras 107 according to step 506.

If there is no associated security camera 107 or the dispatch service 106 has found the URL 205 of the associated security camera 107, then the dispatch service 106 predicts the movement of the subject that generated the security event according to step 508. According to step 510, the dispatch service 106 searches for those security cameras 107 with position information proximate to the predicted path of the subject. According to step 512, the dispatch service 106 retrieves the position information of the all mobile user devices 113 from the network mobile user devices table 206. Then, the dispatch service 106 gets only those mobile user devices 113 that are most proximate to the predicted path of the subject according to step 514. Lastly, the dispatch service 106 pushes the URL 205 and/or the notification to only those mobile user devices 113 most proximate to the predicted path of the subject according to step 516.

Figure 6:
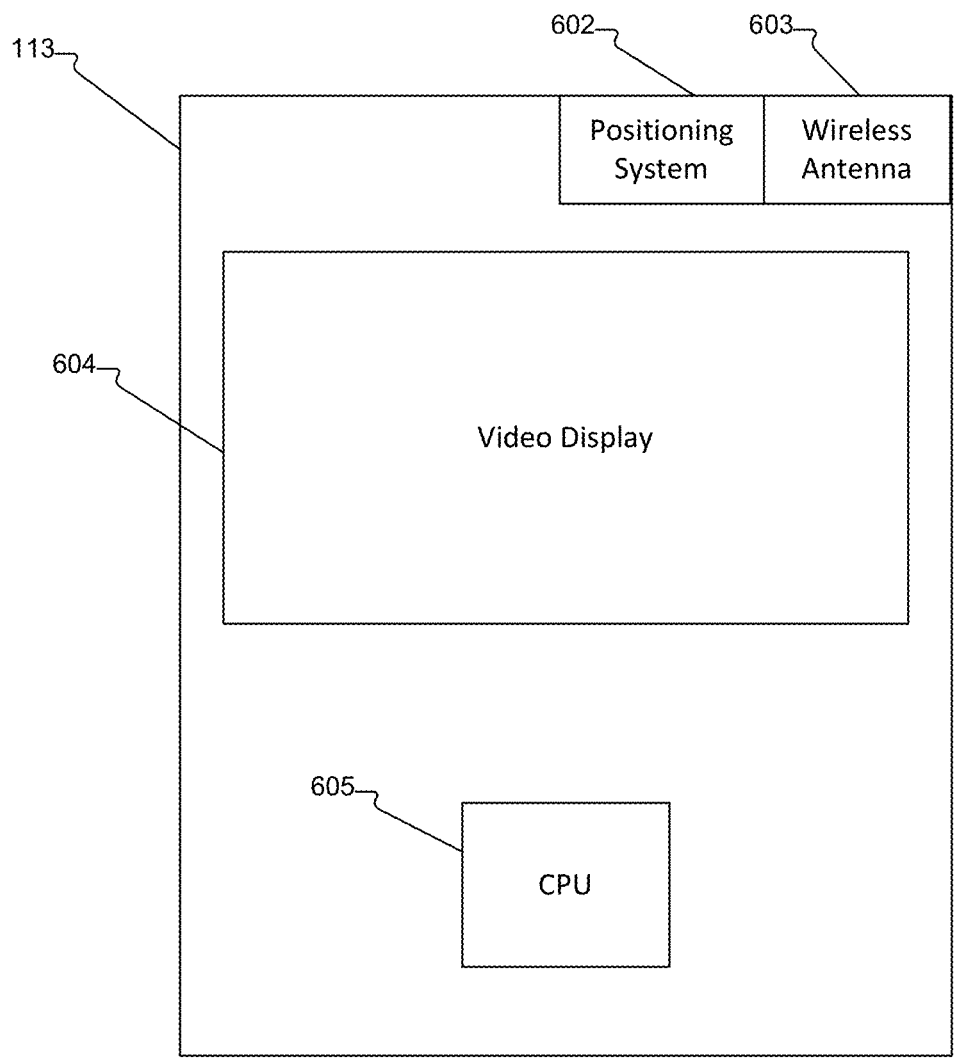
FIG. 6 illustrates the physical components of a mobile user device.

FIG. 6 illustrates the physical components of a mobile user device 113. The mobile user device 113 is comprised of a positioning system 602 that generates position information for the mobile user device 113, wireless antenna 603, video display unit 604, and central processing unit (CPU) 605 among others.

The positioning system 602 determines the position information of the mobile user device 113 via satellite, radio triangulation, or other similar means. The position information is transmitted to the security control system 105 in order to update the coordinates column 209 of the network mobile user devices table 206.

The wireless antenna 603 enables the mobile user device 113 to transmit data via wireless or cellular networks.

The video display unit 604 is a screen that enables the mobile user device 113 to display image data and user interfaces to security guards 114.

Figure 7:
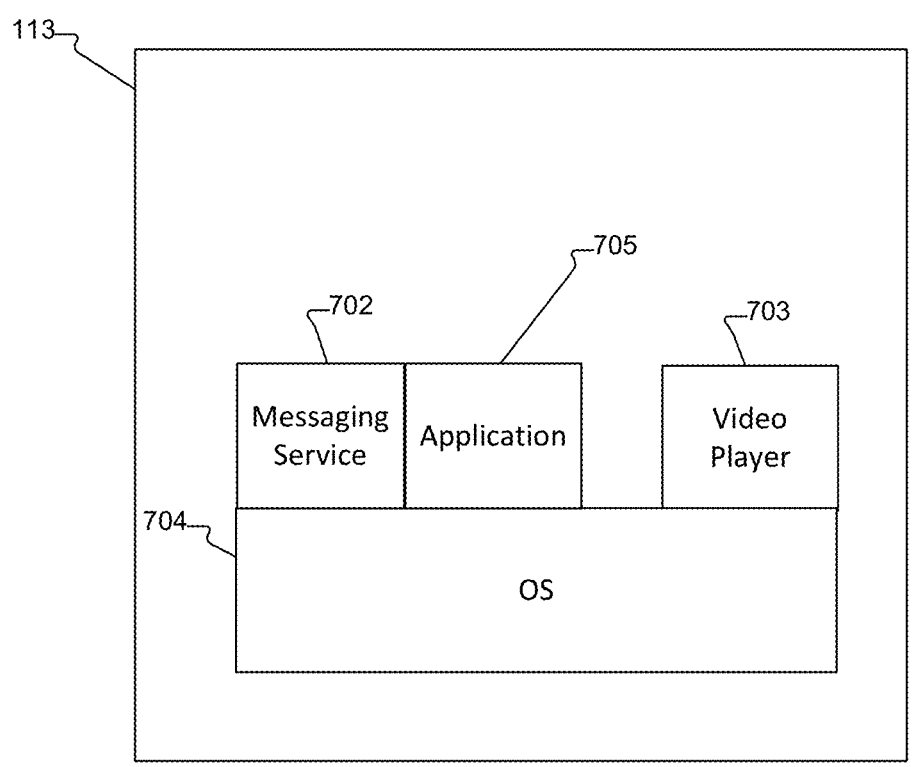
FIG. 7 illustrates the software components of a mobile user device.

FIG. 7 illustrates the software components of a mobile user device 113. The mobile user device 113 is comprised of a messaging service 702, a video player 703, an operating system 704, and a software application 705 among other software components.

The messaging service 702 enables the mobile user device 113 to generate, communicate, receive, and interpret standard format messages transmitted to and from the security control system 105 and dispatch service 106.

The video player 703 enables the mobile user device 113 to retrieve and display live image data transmitted from the dispatch service 106 during a security event.

The software application 705 is responsible for controlling the communication between the mobile user device 113 and the security control system 105. The application 705 calls the messaging service 702 when it decides to transmit a message (e.g., when updating the mobile user device's 113 location in the network mobile user devices table 206) and calls the video player 703 when the security guards 114 attempts to retrieve the image data.

Figure 8:
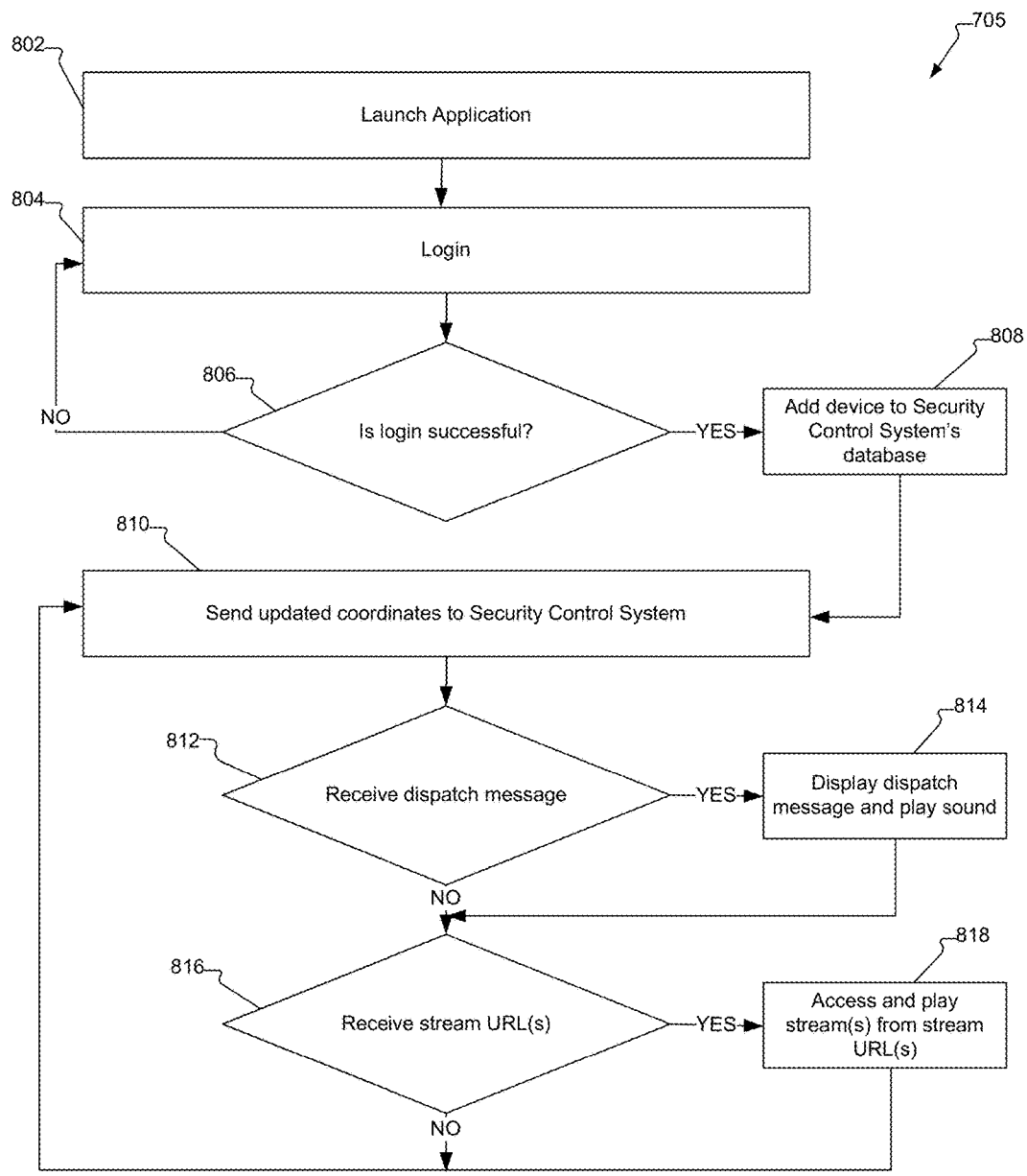
FIG. 8 is a flow diagram illustrating the initialization and operation of a software application on a mobile user device.

FIG. 8 is a flow diagram illustrating the initialization and operation of a software application 705 on a mobile user device 113. According to step 802, the application 705 is launched. The user attempts to log in according to step 804.

The application 705 then determines if the login attempt is successful according to step 806.

If the login attempt is unsuccessful, the user is prompted to login again at step 804.

If the login attempt is successful, the application 705 transmits a message to the security control system 105 to add the mobile user device 113 to the network mobile user devices table 206 according to step 808.

According to step 810, the application 705 later sends updated position information to the security control system 105, which then updates the coordinates column 209 in the network mobile user devices table 206.

If the application 705 receives a dispatch message according to step 812, it displays said message to the user and play a sound according to step 814.

If the application 705 receives one or more URLs according to step 816, then it accesses and plays the one or more associated sets of image data using the video player 703 according to step 818.

While this invention has been particularly shown and described with references to preferred embodiments thereof, it will be understood by those skilled in the art that various changes in form and details may be made therein without departing from the scope of the invention encompassed by the appended claims.

What is claimed is:

1. A security system comprising:
one or more security cameras that capture image data;
a network video recorder for storing and distributing the image data from the security cameras; and
a security control system that receives position information from mobile user devices and provides access to the image data at the mobile user devices based on the position information relative to locations of alarm conditions; wherein the security control system provides access to the image data to the mobile user devices of security personnel that are in closest proximity to the locations of the alarm conditions;
wherein the security control system only provides access to the image data to the mobile user devices of security personnel or first responders who are in proximity to the locations of alarm condition.

2. The security system as claimed in claim 1, wherein the network video recorder includes a video analytics system that analyzes the image data from the security cameras for security events and generates the alarm conditions in response to detecting the security events in the image data.

3. The security system as claimed in claim 2, wherein the security control system determines the locations of the alarm conditions by accessing position information for the security cameras that generated the image data that gave rise to the alarm conditions.

4. The security system as claimed in claim 1, wherein the security control system monitors security and/or safety devices for alarm conditions.

5. The security system as claimed in claim 4, wherein the security control system extracts position information from the security and/or safety devices that generated the alarm conditions to determine the locations of the alarm conditions.

6. The security system as claimed in claim 1, wherein the security control system includes a dispatch service that distributes a reference to the image data to one or more mobile user devices in response to the alarm conditions.

7. The security system as claimed in claim 6, wherein the dispatch service distributes the reference by transmitting a message to the one or more mobile user devices.

8. The security system as claimed in claim 1 further including one or more mobile panic button devices that enable users to selectively generate an alarm condition.

9. The security system as claimed in claim 8, wherein for the mobile panic button devices, the location of the alarm condition is based on position information for the mobile panic button devices.

10. The security system as claimed in claim 1, wherein the mobile user devices determine their respective locations and periodically transmit the position information to the security control system.

11. The security system as claimed in claim 1, wherein the security control system stores the position information in a database.

12. The security system as claimed in claim 1, wherein the security control system determines a predicted path of a subject that generated the alarm condition and provides access to the image data at the mobile user devices based on the position information relative to the predicted path of the subject.

13. The security system as claimed in claim 1, further comprising:
smoke detectors, wherein the smoke detectors raise the alarm conditions in response to sensing smoke.

14. The security system as claimed in claim 1, further comprising:
motion sensors, wherein the motion sensors trigger the alarm conditions in response to sensing movement.

15. A security system comprising:
one or more security cameras that capture image data;
a network video recorder for storing and distributing the image data from the security cameras; and
a security control system that receives position information from mobile user devices and provides access to the image data at the mobile user devices based on the position information relative to locations of alarm conditions; wherein the security control system provides access to the image data to the mobile user devices of security personnel that are in closest proximity to the locations of the alarm conditions; wherein the security control system provides access to the image data only to the mobile user devices of security personnel that are in closest proximity to the locations of the alarm conditions.

\* \* \* \* \*